United States Patent Office 3,538,300
Patented Nov. 3, 1970

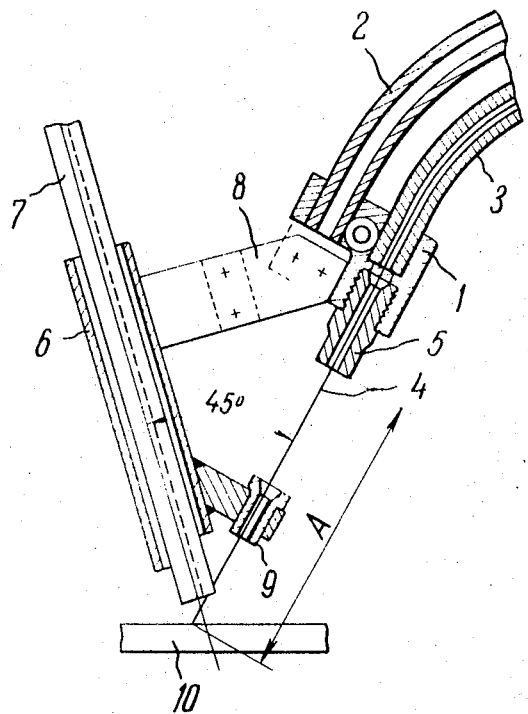

3,538,300
METHOD OF MECHANIZED ELECTRIC ARC WELDING AND BUILDING UP OF METALS AND ALLOYS AND A WELDING HEAD FOR ACCOMPLISHING SAME
Vadim Valentinovich Bazhenov, Ulitsa Sharikopodshipnikovsya 2, kv. 132, Moscow, U.S.S.R.; Gennady Nikolaevich Larin, Ul. Pervomaiskaya 25, kv. 4, Dolgoprundy, Moskovskaya, U.S.S.R.; and Mikhail Fedorovich Khrobastov, Simonovsky val 17, kv. 21, Moscow, U.S.S.R.
Filed Mar. 22, 1967, Ser. No. 625,095
Int. Cl. B23k 9/00
U.S. Cl. 219—130    9 Claims

ABSTRACT OF THE DISCLOSURE

Electric arc welding is achieved by feeding a welding wire from a welding head towards a workpiece while applying welding current to the wire to produce an arc between the free end of the wire and the workpiece, the head having a guide in which a solid rod constituted of electrode coating material is freely received so that the rod rests on the wire in the region of the arc so that the lower end of the rod is continuously melted and fed with the wire to the workpiece. The guide supports the rod at an acute angle with respect to the wire and the rod is formed with a longitudinal groove in which the wire is received so that as the rod is melted the remaining solid part of the rod continuously descends.

---

The present invention relates to welding techniques, and more particularly to methods of mechanized electric arc welding and building up of metals and alloys, and to welding heads for accomplishing said methods.

Known at present are methods of mechanized electric arc welding and building up of metals and alloys with the use of granulated, sintered, and fused welding fluxes. Known also are welding heads for accomplishing said methods, comprising a current lead and a channel for feeding the welding wire.

Said methods, however, do not provide for the welding and building up of parts complicated in shape, nor do they allow accomplishing the welding and building up operations in various positions and performing visual inspections of the molten bath.

Besides, the existing methods involve large losses of welding fluxes, which is likely to increase the cost of welding and building up of metals and their alloys.

The principal object of the present invention is to provide a method of arc welding and building up of metals and alloys without the use of sintered and fused welding fluxes, as well as to provide a welding head for accomplishing the method of the invention.

This object is achieved in a method of electric arc welding and building up of metals and alloys, wherein, according to the present invention, the operations of welding and building up are accomplished, which a rod arranged at an angle with respect to the welding wire, said rod resting on the wire which is continuously fed and functioning during the fusion process as an electrode coating.

The welding head for accomplishing said method comprises a current lead and channel for feeding the welding wire. In conformity with the present invention, secured on the welding head at an angle relative to the direction of feed of the welding wire is a guide for said rod, made as a solid piece, preferably of a round cross section, provided with a longitudinal groove.

It is expedient to select the angle between the rod guide and the direction of feed of the welding wire in a range from 25 to 60°, preferably 45°.

Other objects and advantages of the present invention will be made more fully apparent from a consideration of the following description of an exemplary embodiment thereof, taken in conjunction with the sole figure of the appended drawing, wherein there is diagrammatically shown, partially in section, a welding head for the method of mechanized electric arc welding and building up of metals and alloys.

The welding head comprises a connecting block 1, to which is secured a water-cooled current lead 2; a channel 3 for feeding welding wire 4; a current take-off tip 5 and a guide 6 of a rod 7.

The guide 6 of the rod 7 is secured to the block 1 by means of a plate 8 of electric and heat insulation materials. The angle between the guide 6 and the direction of feed of the welding wire 4 is equal to 45°. The internal surface of the guide 6 allows a free displacement of the rod 7 under the action of its weight. The guide 6 of the rod 7 is provided with a bracket 9 secured to its lower portion for the support of the welding wire 4.

It is recommended to employ the guide 6 with the bracket 9 when welding and building up with the use of a substantial extension A of the welding wire 4, and to omit the bracket 9, when operating with the use of a shortened extension thereof.

The welding head is connected to an automatic or semi-automatic welding apparatus, designed for the electric arc welding and building up of metals and alloys.

The welding head operates in the following manner.

Rod 7 is freely inserted into the guide 6 until it rests on the welding wire 4 which is fed through the channel 3, the tip 5 and the bracket 9.

The rod 7 is manufactured of constituents of electrode coatings and is preferably of a round cross section with a longitudinal groove, whose depth is about 0.3 to 0.5 mm. of the rod diameter. This groove is designed to ensure the supply of the welding wire in position under the rod, into the central part of its cross section.

The welding current is supplied to the welding wire 4 via the current lead 2 through the block 1 and tip 5, and an electric arc is produced between said welding wire and a workpiece 10 to be welded or built up, whereupon the welding wire 4 is fed.

Under the action of the electric arc in whose region the butt end of rod 7 rests on the wire, the butt end of the rod 7 is melted and the rod lowers under the effect of its own weight or any other external force along the guide 6 as the molten flows with the continuously fed welding wire 4.

As a result of the simultaneous fusion of the rod 7 and welding wire 4 in the region of the arc, there is provided the prescribed composition of the deposited metal.

According to the parameters of the welding or building-up process (such as welding current, rate of feed of the welding wire, extension of the welding wire, voltage of a power source at idle running) said method provides a deposition rate up to 30 g./amp-hour.

When describing the embodiment of the invention under consideration, there is employed a concise terminology for the sake of clarity. The invention, however, is not limited by the adopted terms, and it is necessary to take into consideration that each such term comprises all the equivalent component members operating in a similar manner and employed for solving the same problems.

Though the present invention is described in connection with its preferable embodiment, it is evident that there may be modifications and variants that do not depart from the idea and scope of the invention, as will be readily understood by those skilled in the art.

What is claimed is:
1. An electric arc welding method comprising con- tinuously feeding a welding wire towards a workpiece, applying welding current to the welding wire to produce an arc between the free end thereof and the workpiece, and resting a solid rod constituted of electrode coating material on said wire at an acute angle with respect to the wire in the region of the arc, to cause the lower end of the rod to be continuously melted and fed to the workpiece independently of the feed of the wire while the remaining solid part of the rod continuously descends as the rod is consumed.

2. A method as claimed in claim 1 wherein said wire is fed downwardly and the rod descends by gravity as the rod is consumed.

3. A method as claimed in claim 1 wherein said rod is formed with a longitudinal groove in which the wire is received at the lower end of the rod.

4. A welding head comprising a connecting block, a welding wire means connected to said block for feeding the wire towards a workpiece, electrical feed means connected to said block to produce an arc between the wire and the workpiece, a guide member connected to said block and having a guide channel extending at an acute angle with respect to the wire being fed to the workpiece, and a solid rod of electrode coating material loosely received in said guide channel and freely resting on said wire, said rod having a longitudinal groove in which said wire is received, said guide channel being positioned so that the lower end of the rod is in the region of the arc and is continuously melted and fed to the workpiece independently of the feed of the wire, while the remaining solid part of the rod is guided in the guide channel and continuously descends as the rod is consumed.

5. A welding head as claimed in claim 4 wherein said acute angle is between 25 and 60°.

6. A welding head as claimed in claim 4 wherein said acute angle is 45°.

7. A welding head as claimed in claim 4 wherein said rod has a round cross-section.

8. A welding head as claimed in claim 4 comprising means on said guide for the support of the wire at a position between the means for the feeding of the wire and the location where the rod rests on the wire.

9. A welding head as claimed in claim 4 wherein said wire is fed downwardly and said guide is pointed in a direction which has a substantial vertical component.

References Cited

UNITED STATES PATENTS

| 2,093,394 | 9/1937 | Emery | 219—137 |
| 2,562,133 | 7/1951 | Senft | 219—130 |
| 2,681,970 | 6/1954 | Koopman | 219—130 X |
| 2,870,323 | 1/1959 | Roper et al. | 219—137 |
| 2,932,723 | 4/1960 | Sibley et al. | 219—137 X |

FOREIGN PATENTS 1,506,676  11/1967  France.

JOSEPH V. TRUHE, Primary Examiner

C. L. ALBRITTON, Assistant Examiner

U.S. Cl. X.R.

219—137